E. W. McGUIRE.
LAWN MOWER.
APPLICATION FILED NOV. 11, 1912.
1,093,283. Patented Apr. 14, 1914.
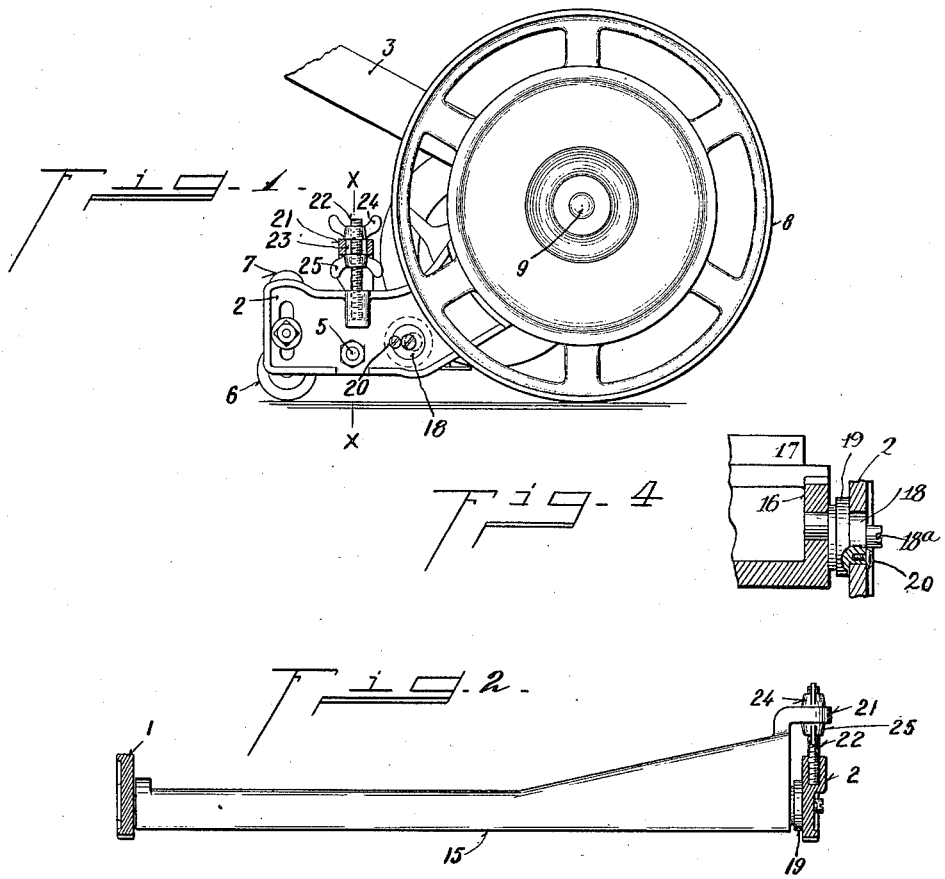
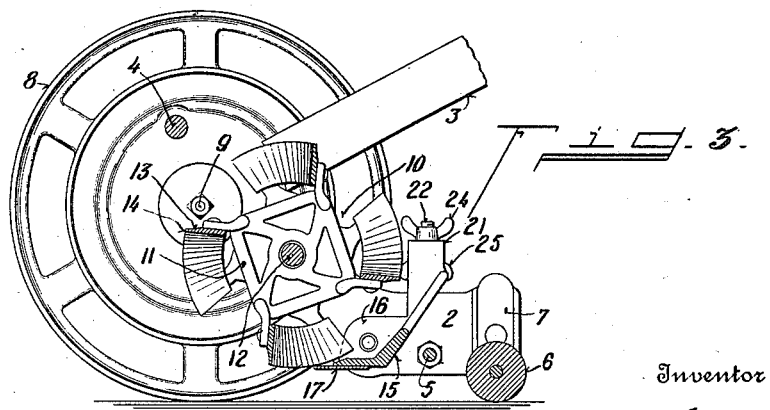
Witnesses
Inventor
Elwood W. McGuire
By Word Word & Nathan
Attorneys

UNITED STATES PATENT OFFICE.

ELWOOD W. McGUIRE, OF RICHMOND, INDIANA.

LAWN-MOWER.

1,093,283. Specification of Letters Patent. Patented Apr. 14, 1914.

Application filed November 11, 1912. Serial No. 730,783.

*To all whom it may concern:*

Be it known that I, ELWOOD W. MCGUIRE, a citizen of the United States, residing at Richmond, in the county of Wayne and State of Indiana, have invented certain new and useful Improvements in Lawn-Mowers, of which the following is a specification.

My invention relates to mowing machines, primarily of that type termed "lawn mowers", in which the cutting instrumentalities comprise a stationary cutter bar or blade, and a coacting rotative cutting reel formed of a series of spirally shaped blades. The periphery of these blades in their rotation aline and engage with the upper edge surface of the stationary cutter blade. The cutter members are mounted between a pair of side frames supported upon ground wheels, with the cutting reel in driven connection with the ground wheels, or one of them, and in this respect it is customary to interpose ratchet mechanism in the power train driving gear, whereby forward rotation of the ground wheel or wheels communicates the power to the reel, while a reverse disconnects the same. To produce a continuous progressive cutting action between the spiral cutter blades and the rotative cutter reel and the stationary cutter bar or blade, longitudinally their entire length, it is of vital importance to have the two cutting members absolutely in alinement coincidentally with each other. The longitudinal alinement of the cutting edges of both must coincide their entire length with a uniform degree of shearing contact, so as not to injure portions of the cutter blades and destroy their cutting capacity. Therefore, it is to this feature of a lawn mower to which my invention principally appertains and is primarily directed to the construction, mounting and adjustment of the stationary cutter bar to produce the longitudinal alinement between the cutting elements.

Therefore, an object of my invention is to provide a pivotally mounted stationary cutter blade of a lawn mower having one end journaled in an adjustable bearing, to longitudinally aline its cutting edge with the longitudinal cutting plane of a rotative cutter blade reel.

Another object of my invention is to provide a stationary cutter blade of a lawn mower with means for adjusting its longitudinal cutting plane coincidentally parallel with the longitudinal peripheral cutting surfaces of the blades of a rotative cutting reel.

Another object of my invention is to provide a swingingly supported stationary cutter blade of a lawn mower mounted in a longitudinal plane, with coacting longitudinal peripheral cutting surfaces of a series of rotative cutter reel blades with means engaging one end of the stationary cutter blade for swinging the same relatively to and from the cutting surfaces of the reel blade to regulate and adjust and lock the same.

Another object of my invention is to provide a pivotally mounted stationary cutter bar with a longitudinal reinforcing rib increasing in its cross-sectional area toward one of the side frames of the machine, and terminating with an ear overlapping such frame, the frame provided with a screw rod projecting through the ear with thumb lock nuts threaded on said rod, one upon each side of the ear to swing or adjust the cutting blade of the cutter bar to regulate the blade cutting edge relatively with the longitudinal peripheral cutting surfaces of the blades of a rotative reel.

The features of my invention will be more fully set forth in the description of the accompanying drawings, illustrating the preferred embodiment of my invention, in which:—

Figure 1 is an end elevation of a lawn mower showing the adjusting ear of the stationary cutter bar in section. Fig. 2 is a section on line $x$, $x$, Fig. 1 of the side frames and rear elevation of the stationary cutter bar with all other elements of the machine which present themselves on a section taken on such line omitted. Fig. 3 is a vertical section through the intermediate portion of the lawn mower. Fig. 4 is an enlarged section through one end of the stationary cutter member and its adjustable fulcrum mounted upon the side frame.

The drawings illustrate in detail only those elements of the lawn mower as are necessary to impart a clear understanding of my invention, and the specific elements for controlling and rotating or driving the cutting reel are not herein shown, but are well-understood in the art, and commensurate in lawn mowers of this class, and it is not regarded essential to elaborate thereon.

1, 2 represent the side frames of the machine, to which the handle 3 is connected in any well-known manner. The side frames 1, 2 are rigidly connected by the tie rods 4, 5, securing the forward and rearward ends, which side frames and rods constitute substantially a rectangular frame.

6 represents a gage roller journaled in slide blocks 7 adjustably mounted upon the rear ends or tail projection of each side frame so as to regulate the distance of the cutting mechanism above the surface over which the machine is propelled.

Adjacent to each side frame 1 and 2 a ground wheel 8 is journaled, and preferably upon a sleeve bearing projecting from the side frame through which a bolt 9 passes for securing the wheel in position. These ground wheels usually have a roughened tread to increase the traction.

10 represents a cutting reel, and in the preferred type herein illustrated comprises a series of spiders 11 fixed to the axle 12 journaled at each end in bearings formed in the side frames 1 and 2, and projecting into a housing portion of the ground wheel or side frame, within which the transmission and ratchet elements are contained for controlling the rotative motion between the ground wheels and axle 12. Each spider, as illustrated, is provided with four ears or lugs, to which the spirally spaced cutting blades 13 are secured, with their peripheral cutting surface 14 ground to a longitudinal plane. The number of blades of the cutting reel is optional as far as the features of my invention are concerned. The cutting surfaces of all of the cutting blades of the reel are ground coincidentally to a given radius so as to provide a true circumferential and longitudinal plane, and by reason of the spirality provide, substantially in their rotation, continuous cutting action with the stationary cutter. Therefore, it is essential that the stationary cutter blade be coördinately positioned to produce the proper or shear action between the two members.

The stationary cutter bar 15 is preferably of angle formation, provided with the integral end lugs or flanges 16, positioned adjacent to the side frames 1 and 2 respectively, and into which the stud bolt or fulcrum pins engage for mounting the cutter bar pivotally between the side frames. The horizontal portion of the cutter bar is provided with the cutter blade 17 adapted to engage or coact with the cutting reel blades, providing a renewable cutter blade, and also enabling the stationary cutter member to be made of two different kinds of material best suited for the purposes to which each is subjected. The fulcrum on one side is journaled in a permanent bearing in the side frame, while on the opposite side an eccentric bushing 18 is mounted within the side frame having a pintle projected therefrom into a bore of the flange 16 of the cutter bar upon which the cutter bar journals. The bushing is provided with an annular flange 19 engaging one side of the side frame 2, while a screw 20 engages into the opposite side of the bushing, its head engaging with the side frame for rigidly clamping the bushing in an adjusted position to the side frames. The bushing is provided with a groove 18$^a$ for a screw driver engagement, to turn the bushing within the frame bore to longitudinally aline the stationary cutter blade 17 with the circumferential cutting surface of the cutting reel, after which the bushing is set with the cutter bar free to swing to and from the cutting reel, without disturbing its journal with the side frames. This is quite an advantage in that it saves special work in the factory in machining the parts, eliminating the refined, accurate and delicate work required in centering the bearings to bring the same in a longitudinal axial plane, for a coincident longitudinal plane, with the longitudinal circumferential surface of the cutting reel which is essential to produce a uniform cut throughout the entire area. After the relative longitudinal adjustment has been made between the two cutter members, a second adjustment is made to bring the cutting edge of the stationary cutter blade to its proper degree of shear contact with the cutting reel, which is accomplished by swinging the stationary cutter bar at a point in rear of the fulcrum, and locking it in its adjusted position, preferably by the following instrumentalities: 21 represents an ear or lug formed integral with the cutter bar 15 at one end thereof and projected over a respective side frame, in this instance over side frame 2. Such end of the cutter bar has the rear rib thereof tapering toward the upper end of the ear or lug 21, to provide additional reinforcements for the cutter bar, making the same a very rigid element, which rib, or the angle formation of the cutter bar serves to substantially prevent intermediate flexing of the cutter bar, which flexing tends to disturb the longitudinal plane and cutting action of the cutter members causing a failure to cut through the entire cutter area.

The frame 2 is provided with a screw rod 22 projected upwardly therefrom and through an oblong slot 23, formed in the ear 21.

24 and 25 represent thumb nuts screw-threaded upon the rod 22, one upon each side of the ear or lug 21, the adjustment of which defines and controls the swinging movement of the stationary cutter bar and its blade, and when both are tightened against the ear or lug, lock the same securely in an adjusted position. By this means the stationary cutter bar can be adjusted or regulated at one point, and at all times maintaining the longitudinal plane of the cutter blade, as it is impossible to non-uniformly swing the same or distort the longitudinal plane by bringing counter or twisting pressures upon the stationary cutter blade. The common practice of adjusting the stationary cutter blades of lawn mowers is usually by means of set screw elements engaging each end of the bar, and upon opposite sides of each fulcrum, which causes a twisting of the cutter bar or blade, rendering it almost impossible for the user to adjust the stationary blade relatively to and from the cutting reel, and maintain the longitudinal plane thereof coincident with the longitudinal circumferential plane of the cutting reel, and from observation, it has been found that very few mowers in use are ever properly adjusted to cut throughout its entire cutting area, and that this is soon disturbed after the user manipulates the mower, as the average person is incompetent and inexperienced to make such delicate adjustment.

In locking the stationary cutter bar upon both sides of the ear projected therefrom and to the side frame or frames the cutter bar and side frames become substantially a unitary structure additionally functioning in adding rigidity to the structure as a whole in conjunction with the tie rods, more advantageously holding the parts in their set position against accidental displacement, and making the adjustment upon one side of the fulcrum, eliminates any possibility of exerting flexing strains upon the stationary cutter blade such as might have a tendency to disturb its longitudinal plane.

With my improvement the cutter planes of both rotary and stationary cutters are not made irregular by wear, which occurs in mowers as heretofore constructed; the stationary cutter blade is usually of a very hard metal, while the blades of the cutting reel are comparatively softer; whereof, it will be self-evident that the one will disturb the true plane of the other if they do not uniformly engage throughout their cutting length, and the self-sharpening feature which these types of mowers are alleged to possess is not inherent.

The drawings and description are directed to the adjusting elements of the stationary cutter bar at one side of the frame, but it is obvious that the same can be duplicated upon the opposite side, and therefore, do not herein wish to be confined to a singular use. The cutter bar, as herein specifically shown and described, can also be structurally changed and modified, and therefore, I do not wish to be limited to the design of structure, except whereof mention is specifically made in the claims.

Having described my invention, I claim:—

1. In a lawn mower, a pair of side frames, a cutting reel journaled between said frames, a pivotally mounted cutter bar for coöperation with the blades of the cutting reel, means for adjusting the axial plane of the cutter bar to coincidentally aline said cutting elements longitudinally, an apertured extension projecting from one end of the cutter bar transversely over one of the side frames coöperatively engaging with adjusting elements on such side frame.

2. In a lawn mower, a pair of side frames, forward and rearward tie rods uniting said frame, a cutting reel journaled between said frames, a pivotally mounted cutter bar for coöperation with the blades of the cutting reel, means for adjusting the axial plane of the cutter bar to coincidentally aline said cutting element longitudinally, adjusting elements on one of said side frames coöperatively engaging with said cutter bar on one side of the cutter bar axis to adjust the cutting edge of said cutter bar relatively to and from the blades of the cutting reel.

3. In a lawn mower, a pair of side frames, a cutting reel journaled between said frames, a pivotally mounted cutter bar for coöperation with the blades of the cutting reel mounted in bearings in said side frame, means for varying the fulcrum position in one of said side frames to change the axial plane of said cutter bar, means on one of said side frames engaging said cutter bar to swing and lock the same.

4. In a lawn mower, a pair of side frames, a cutting reel journaled between said frames, a stationary cutter bar having a cutter blade for coöperation with the blades of the cutting reel, said cutter bar fulcrumed within the side frames, an extension projecting from one end of said cutter bar overlapping its adjacent side frame, a rigid screw-threaded element projecting from the side frame and passing through an aperture in said cutter bar extension, thumb nuts on said element oppositely engaging said extension for swinging and locking the cutter bar to adjust its cutting edge coördinately with the blades of the cutting reel.

5. A lawn mower of the nature disclosed combining a pair of side frames, a rotative cutter reel supported intermediate of said side frames, a pivoted cutter bar intermediate of the side frames having transverse extensions, one adjacent each side frame, an axis connected with one of said bar extensions located in a permanent bearing in its adjacent side frame, an axis connected with the opposite extension located in an adjustable bearing in its adjacent side frame to coincidentally aline the bar with the cutter reel, and an element projecting from said bar engaging with one of the side frames for swinging and adjusting the bar relatively toward and from the cutter reel.

6. A lawn mower of the nature disclosed combining a pair of side frames, a rotative cutter reel supported intermediate of said side frames, a pivoted relatively stationary cutter bar supported intermediate of said side frames having its axis at one end supported in a permanent bearing in one of the side frames and at the opposite end supported in an adjustable bearing in the respective opposing side frame, and an element projecting from said bar engaging with one of the side frames for swinging and adjusting the bar relatively toward and from the cutter reel.

7. A lawn mower of the nature disclosed combining a pair of side frames, a rotative cutter reel supported intermediate of said side frames, a pivoted relatively stationary cutter bar supported intermediate of said side frames having its axis at one end supported in a permanent bearing in one of the side frames and at the opposite end supported in an adjustable bearing in the respective opposing side frame, an extension extending longitudinally from one end of said cutter bar overlapping a respective adjacent side frame and capable of being clamped thereto in adjusted positions.

In testimony whereof, I have hereunto set my hand.

ELWOOD W. McGUIRE.

Witnesses:
 CLARENCE B. FOSTER,
 LOUISE A. BECK.

---

Copies of this patent may be obtained for five cents each, by addressing the "Commissioner of Patents, Washington, D. C."